July 11, 1961   R. A. TAYLOR ET AL   2,991,858
RIVET
Filed Oct. 14, 1953

INVENTORS:
John P. Strachan
BY & Romie A. Taylor

ATTORNEY

United States Patent Office 2,991,858
Patented July 11, 1961

2,991,858
RIVET

Romie A. Taylor and John P. Strachan, San Diego, Calif., assignors, by mesne assignments, to General Dynamics Corporation, a corporation of Delaware
Filed Oct. 14, 1953, Ser. No. 385,972
6 Claims. (Cl. 189—36)

This invention relates generally to rivets and more particularly a rivet of the flush type which is adapted to provide a substantially fluid-tight joint between the rivet and the sheets or plates through which the rivet is disposed.

In a conventional or standard flush rivet of this type the rivet comprises a head integral with a substantially cylindrical shank which is adapted to be disposed through registering circular holes in the associated sheets or plates to be joined, one end of such shank being adapted for deformation into tight and locking engagement with the abutting sheet or plate. The rivet head conventionally has it undersurface flared or tapered outwardly from the shank, producing a conical frustum having an included angle of approximately 100°, to thereby provide a conical or oblique surface which is adapted for engagement with a mating countersunk opening or seat in the abutting sheet or plate. With this construction the sheets or plates, usually two, which are to be joined are fixedly secured together. In addition, the rivet head is made flush with the outer surface of the plate in which it is located to thereby provide a smooth and continuous surface which is characterized by very low aerodynamic parasitic drag.

The conventional flush rivet just described, and herein sometimes conveniently referred to as a countersunk rivet, has been found in practice to be objectionable mainly for the reason that shear forces, exerted against the rivet by the joined plates, tend to prematurely deform the rivet whereby the sealant properties of the rivet are substantially destroyed. More particularly, assuming such a conventional rivet is serving to secure two plates together, it will be found that the shear forces transmitted by the lower plate act horizontally in one direction against the lower shank of the rivet, and the shear forces transmitted by the upper plate act horizontally in the opposite direction against the upper shank of the rivet and against approximately one-half of the periphery of the inclined or conical undersurface of the rivet head. These horizontal shear forces produce a vector or a resultant force which acts perpendicular to the inclined undersurface of the rivet head to result in a cocking or lifting of the rivet head from its countersunk seat in the upper plate, which lifting undesirably occurs substantially before the full shear strength of the rivet shank can be utilized. This action of the rivet head is particularly undesirable in those situations where the upper and lower plates form the outer portion of a structure such as an aircraft integral fuel tank under pressure because the lifting of the rivet head from its seat will result in immediate leaking of fuel between the rivet and the joined plates.

The conventional rivet is further objectionable in that the clamping action of the rivet, that is, the action of the rivet in holding together a pair of plates, is not completely utilized in forcing the rivet head against its countersunk seat. Inasmuch as this clamping action is in the nature of a compression force perpendicular to the surface of the plates for pulling the rivet head against its seat and that seat is inclined, only a portion or component of this compression force will be exerted perpendicular to the inclined surface of the seat to force the rivet head against the seat. This disadvantage is particularly significant when such a rivet is used in aircraft integral fuel tanks where maximum clamping action is desirable in order to substantially prevent fuel leakage between the rivet and its associated sheet or plate. Shearing forces between the plates riveted with rivets having tapered undersurfaces utilize the rivet taper as an inclined plane to cause elongation of the rivet and resulting failure of the leakproof seal.

The undesirable features and characteristics of the conventional countersunk rivet just described are substantially eliminated in the rivet of the present invention which comprises a shank and a rivet head formed on the shank, the rivet head being of a configuration adapting it to be located in flush relationship in a counterbored opening of complemental shape provided in the sheet or plate associated therewith. Upon driving of the rivet, the rivet head is so firmly affixed in position as to be substantially immovable relative to the plate in which it is disposed by virtue of the swelling action of the rivet head against the sides of the counterbored opening. In the present rivet, lifting or cocking of the head under operational loads is virtually eliminated. In addition, the absence of head lifting permits a much greater proportion of the full shear strength of the rivet shank to be utilized without the danger of leakage occurring between the rivet and the secured plates, as compared with a countersunk rivet. Further, the configuration of the rivet head is such that maximum utilization of the rivet clamping action is made to produce a liquid-tight joint. The present invention contemplates that a sealing ring may be used with the subject rivet, if desired, to further improve the fluid sealant properties of the joint.

It is therefore one of the principal objects of this invention to provide a flush rivet of novel construction which is adapted to produce a fluid-tight joint between the rivet and the sheets or plates through which the rivet is disposed.

Another object of the invention is the provision of a flush rivet of unique form which is adapted for withstanding shear forces without appreciable deformation up to substantially the shear strength of the rivet shank.

A further object of the invention is to provide an improved flush rivet having a rivet head of a novel shape or configuration whereby the rivet head on being driven is adapted to be substantially immovable with respect to the sheet or plate with which it is associated.

Another object of the invention is the provision of a flush rivet having a construction adapted for improved utilization of the clamping action of the rivet to thereby provide a fluid-tight joint between the rivet head and its associated sheet or plate.

Still another object of the invention is to provide an improved flush rivet which together with a sealing ring or washer is adapted for contiguous and fluid-sealing relation with a counterbored seat of complemental configuration provided in an associated sheet or plate.

A still further object of the invention is the provision of an improved form of flush rivet which includes in its construction means for providing an indication of the height of rivet head remaining after the riveting and milling operations have been performed thereupon.

Other objects and features of the present invention will be readily apparent to those skilled in the art from the following specification and appended drawings wherein is illustrated a preferred form of the invention, and in which.

Figure 1:
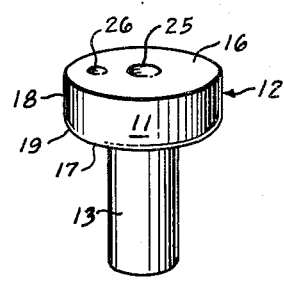
FIGURE 1 is a perspective view of a preferred embodiment of a flush rivet according to the invention.
Figure 2:
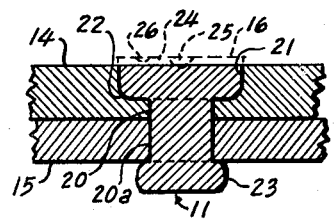
FIGURE 2 is an elevational view in section of the rivet of FIGURE 1 after it has been worked to secure together a pair of overlapped plates.

Reference now will be had in detail to the drawings and in particular to FIGURES 1 and 2, wherein one embodiment of the flush rivet in accordance with the present invention is shown. The present flush rivet, generally designated 11, comprises a head 12 which is integral with a substantially cylindrical shank 13, which head and shank cooperate to secure together a pair of plates 14 and 15.

Head 12, as illustrated, is substantially cylindrical in shape, and embodies a flat upper surface 16 and a lower flat surface or undersurface 17 of smaller diameter than upper surface 16. The diameter of head 12 is substantially constant throughout its height from upper surface 16 to a point slightly above undersurface 17, thereby forming a vertical peripheral side 18, and from this point to the undersurface 17 the diameter of head 12 gradually decreases whereby an elliptical, or preferably radial, shoulder 19 is formed which merges at its ends into vertical side 18 and undersurface 17. Thus, in elevational cross section head 12 includes a horizontal upper surface 16 which terminates in a vertical peripheral side 18 which in turn is connected to undersurface 17 by a rounded portion or shoulder 19.

In order to use rivet 11 for securing together plates 14 and 15, shank 13 is disposed through registering or aligned circular openings 20 and 20a provided therefor in plates 14 and 15, respectively and head 12 is positioned within a recess 21 which is in effect a flat bottomed enlargement of the entrance to the opening 20 provided in sheet 14 for shank 13. This recess or seat 21 is shaped complemental to head 12 so as to closely accommodate head 12, and is preferably formed by a counterboring operation using a usual drill or the like adapted for drilling the openings in plates 14 and 15 for shank 13 and also for drilling the larger opening for head 12. As seen, the counterbored opening embodies an annular fillet 22 at its lower periphery conforming to the configuration of shoulder 19 to thereby seat shoulder 19 of head 12 in substantially snug, abutting relationship, and also to afford a rivet joint which will withstand fatigue stresses at the lower periphery of the counterbored opening or recess 21.

In positioning rivet 11 within openings or holes 20 and 20a in plates 14 and 15 sufficient clearance is permitted between the rivet and the hole defining portions of the plates to afford a sliding fit. This slight clearance, together with such additional clearance as may occur in production practices, is overcome or eliminated in the driving of the rivet, as will be hereinafter fully discussed, whereby intimate bearing is had between the rivet 11 and plates 14 and 15.

Rivet 11 is preferably made of a malleable material such as, for example, 24 ST aluminum alloy which, as is well known, is usually driven while in a refrigerated condition. During driving, the malleable nature of rivet 11 permits deformation or flow of the material of head 12 whereby this material is forced or pressed into very tight contact with the sides and bottom of the counterbored opening of recess 21 in plate 14, and deformation of the upper and mid portions of shank 13 results in a similarly firm contact between the material of the shank and the sides of the openings 20 and 20a therefor in sheets 14 and 15. It is apparent that with respect to sheet 14, head 12 is virtually immovable since in the driving operation the material thereof becomes, in effect, integrated or fused with sheet 14. Simultaneously with the affixing of the head 12 in its recess the projecting lower end of shank 13 is formed by the driving operation into a flattened portion 23 which in combination with head 12 fixedly and tightly secures together plates 14 and 15. The described intimate association effected between the driven rivet 11 and the plates 14 and 15 results in a fluid-tight joint capable of withstanding great stresses.

It is here noted that the height of head 12 is made somewhat greater than the depth of the recess or counterbored opening, as illustrated by the dotted lines in FIGURE 2, whereby after driving of rivet 11 there remains a raised portion 24 of head 12 projecting above the surface of plate 14, which portion 24 spaces the driving means, as for example a rivet gun, from sheet 14 to thereby prevent marring of sheet 14 by the rivet gun. This raised portion 24 is machined off, as by milling or the like, to thereby make head 12 flush with the upper surface of plate 14 whereby a smooth and continuous surface is provided.

Head 12 embodies a recess or depression 25 which may be centrally located in upper surface 16 of head 12. A second recess or depression 26 is provided in upper surface 16 outwardly of depression 25, depression 26 being of lesser depth than depression 25. These depressions are utilized to indicate the thickness, that is height, of head 12 after driving of rivet 11 and milling of head 12 to flush relationship with sheet 14. By examining a driven rivet 11, an inspector can readily determine the height of head 12 within recess 21 by the presence or absence of one or both of depressions 25 and 26. For example, depression 25 may be made of such a depth that if a slight trace of the depression remains after milling, it can be concluded that head 12 and the opening therefor in sheet 14 are satisfactory in height and depth, respectively. On the other hand, complete absence of depression 25 after milling will denote that the opening in sheet 14 was not sufficiently deep and that in order to attain flush relationship with sheet 14, the head 12 was milled too thin for structural strength of rivet 11. Replacement of this rivet would then be made.

As to depression 26, it is made of such a depth that if it is not completely milled away in obtaining a flush relationship with sheet 14 it is apparent to the inspector that the opening in sheet 14 is excessively deep and the thickness of head 12 too great. The excessive removal of material from sheet 14 in effecting an oversize recess 21 is detrimental and the inspector would then be required to make a decision to effect replacement of the sheet or to take measures to compensate or correct for an unsatisfactory rivet joint. Ideally, the driven and milled rivet head 12 should exhibit a trace of depression 25 and an absence of the depression 26 whereby it can be concluded that the height of head 12 and depth of the opening therefor in sheet 14 are proper.

Figure 3:
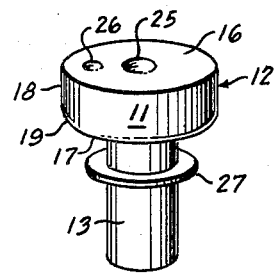
FIGURE 3 is a perspective view of the rivet of FIGURE 1 associated with a sealing ring or washer.
Figure 4:
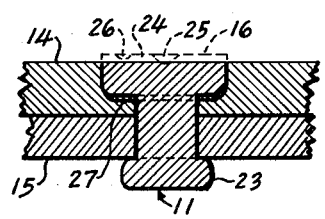
FIGURE 4 is an elevational view in section of the rivet and sealing ring of FIGURE 3 after being driven to secure together a pair of overlapped plates.

The fluid-tight or sealant characteristics of rivet 11 may be improved by the use of a thin, annular sealing element or washer 27 therewith, as illustrated in FIGURES 3 and 4. Washer 27, which is preferably made of a soft and malleable material such as 0.004" thick 2 S aluminum, has an outer diameter approximately equal to the diameter of undersurface 17 of head 12, and an inner diameter slightly greater than the diameter of shank 13 whereby washer 27 is adapted for location about shank 13 in encircling relationship.

The manner of use of rivet 11 together with washer 27 is substantially the same as that of rivet 11 by itself. Washer 27 is disposed over shank 13, and rivet 11 with washer 27 is positioned through suitable registering openings 20 and 20a provided therefor in sheets 14 and 15 as before. As illustrated, washer 27 is thereby located between undersurface 17 of head 12 and the lower or seat portion of the counterbored recess 11 provided in sheet 14. Upon driving rivet 11, washer 27 flows or deforms and tends ot fill such voids as may exist between undersurface 17 and plate 14; between plate 14 and portions of shoulder 19, and between plate 14 and the upper portion of shank 13 to thereby provide a fluid-tight joint, washer 27 being compressed and deformed by the clamping or compressive action of rivet 11. Raised portion 24 of rivet 11 is then milled off, as described previously, to produce a flush surface with plate 14.

In tests it has been found that the use of washer 27 with rivet 11 in accordance with the present invention provides excellent rivet joint sealing for an aircraft pressurized fuel tank even after a great number of pressure on- pressure off load cycles.

Figure 6:
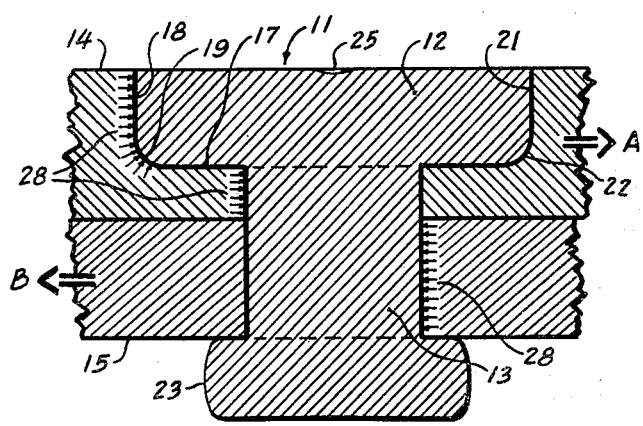
FIGURE 6 is an enlarged elevational view partly in section of the rivet of FIGURE 1 illustrating in detail the action of operational forces upon the rivet.

The rivet of the present invention efficiently and effectively fulfills its intended purpose. For example, assuming the existence of operational shear loads A and B on plates 14 and 15, respectively, as illustrated in FIGURE 6, distributed shear loads will generally act upon rivet 11 as conveniently indicated by the arrows 28. It is apparent that these distributed shear loads act almost entirely against the vertical faces of rivet 11, such as shank 13 and the peripheral side 18 of head 12, with a negligible load acting normal to and against shoulder 19 whereby lifting or cocking of head 12 is substantially prevented. In addition, such lifting of head 12 is also reduced or substantially eliminated by virtue of the resistance provided by the frictional action of side 18 against the sides of the opening in which head 12 is seated.

Figure 5:
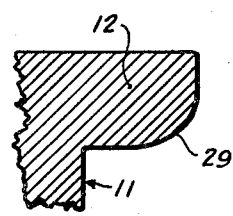
FIGURE 5 is a partial detail elevational view of another configuration for the peripheral shoulder of the rivet.

Should shear loads be anticipated which are critical in bearing or net section of plate 14, such as occasioned by vibration or fatigue stresses, the allowable bearing may be effectively increased by changing the preferred radial configuration of shoulder 19 of head 12 to an elliptical configuration, as indicated by the numeral 29 in FIGURE 5, having a preferred eccentricity of approximately 0.5. It is understood that the recess 21 which will accommodate a head of this type will be provided with a shape complemental thereto. However, it has been found that in most sealing applications the radial configuration of shoulder 19 of the rivet embodiment of FIGURE 1 can be used. Moreover a rivet employing a shoulder having a radial configuration is more practicable since it is easier to form and thereby better adapted to quantity manufacture.

The radius of a radial shoulder 19 is made sufficiently large to prevent stress concentration at the lower periphery of the base of the complemental opening in plate 14 in which the shoulder 19 is seated. Further, the radius of shoulder 19 is made sufficiently small, relative to the height of peripheral side 18 and the diameter of undersurface 17, to afford a horizontal undersurface 17 of an area adequate to perform its sealing function, and also to assure a peripheral side 18 of a height adequate to develop frictional action against plate 14 sufficient to resist any lifting or cocking forces exerted against head 12 and in particular against shoulder 19. The magnitude of a satisfactory radius for a shoulder 19 is readily determined by conventional trial and error test procedures. The following table gives two examples of suitable dimensions for a rivet 11 and the openings therefor in sheets 14 and 15, and also dimensions for a suitable washer 27, it being understood that the dimensions noted are provided for illustrative purposes.

|  | Inches | |
| --- | --- | --- |
| Diameter of shank 13 | 0.187 | 0.250 |
| Diameter of head 12 | 0.330 | 0.440 |
| Height of head 12 | 0.105 | 0.115 |
| Radius of shoulder 19 | 0.030 | 0.040 |
| Thickness of plate 14 | 0.114 | 0.125 |
| Depth of recess 21 | 0.072 | 0.080 |
| Raised portion of head 12 (After driving, before milling) | 0.015 | 0.015 |
| Depth of depression 25 | .049 | .053 |
| Depth of depression 26 | .029 | .033 |
| Inner diameter of washer 27 | 0.189 | 0.252 |
| Outer diameter of washer 27 | 0.275 | 0.365 |

While certain preferred embodiments of the invention have been specifically disclosed, it is understood that the invention is not limited thereto as many variations will be readily apparent to those skilled in the art and the invention is to be given its broadest possible interpretation.

What we claim is:

1. A flush rivet for securing together a pair of plates having aligned rivet shank receiving openings and a recessed counterbored portion having vertical walls extending inwardly from the outer surface of one of said plates, an annular fillet at its lower periphery and a flat bottomed rivet head undersurface engaging surface, said rivet comprising a shank and a head, said head having a top diameter slightly larger than said counterbored portion to thereby provide for a snug fluid tight fit when inserted therein, said rivet being of a material which when cooled will provide sufficient shrinkage to permit insertion of said head into said counterbored portion, said head having a lower flat undersurface of smaller diameter, a vertical peripheral side wall and lower shoulder interconnecting said top and said smaller diameter surfaces, said lower shoulder having a complementary configuration with said fillet to thereby engage said fillet in substantially snug, abutting relationship when said rivet head has been properly seated within said counterbored portion.

2. A flush rivet for securing together a pair of plates having aligned rivet shank receiving openings and a recessed counterbored portion having vertical walls extending inwardly from the outer surface of one of said plates, an annular fillet at its lower periphery and a flat bottomed rivet head undersurface engaging surface, said rivet comprising a shank and a head, said head having a top diameter slightly larger than said counterbored portion to thereby provide for a snug fluid tight fit when inserted, therein, said head having a lower flat undersurface of smaller diameter, a vertical peripheral side wall and lower shoulder interconnecting said top and said smaller diameter surfaces, said lower shoulder having a complementary configuration with said fillet to thereby engage said fillet in substantially snug, abutting relationship when said rivet head has been properly seated within said counterbored portion, said head having a greater thickness between its outer surface and its inner surface than the depth of said counterbored portion, said head outer surface having a pair of depressions therein, one of said depressions extending below the plane of the outer surface of said one plate and the other of said depressions terminating above said plane when said counterbored portion has a predetermined depth and said rivet head has been properly seated within said counterbored portion.

3. In combination, a pair of plates having aligned rivet shank receiving openings and a recessed counterbored portion having vertical walls extending inwardly from the outer surface of one of said plates, said counterbored portion having an annular fillet at its lower periphery and a flat bottomed rivet head undersurface engaging surface, and a rivet inserted within said openings securing together said plates, said rivet comprising a shank and a head, said head having a top diameter of such size relative to said counterbored portion to thereby provide for a snug fluid tight fit therein, said rivet being of a material which when cooled provided sufficient shrinkage to permit insertion of said head into said counterbored portion, said head having a lower flat undersurface of smaller diameter, a vertical peripheral side and lower shoulder interconnecting said top and said smaller diameter surfaces, said lower shoulder having a complementary configuration with said fillet to thereby engage said fillet in substantially snug, abutting relationship, said head being fused with said one plate, said head having a greater thickness between its outer surface and its inner surface than the depth of said counterbored portion, said head outer surface having a pair of depressions therein, one of said depressions extending below the plane of the outer surface of said one plate and the other of said depressions terminating above said plane when said counterbored portion has a predetermined depth and said rivet head has been properly seated within said counterbored portion.

4. A pair of plates having aligned rivet shank receiving openings and a recessed counterbored portion having vertical walls extending inwardly from the outer surface of one of said plates, and a rivet inserted within said openings and securing together said plates, said rivet comprising a shank and a head, said head having a top diameter of such size relative to said counterbored portion to thereby provide for a snug fluid tight fit therein, said head having a lower flat undersurface of smaller diameter, a vertical peripheral side and lower shoulder interconnecting said top and said smaller diameter surfaces, said head having a greater thickness between its outer surface and its inner surface than the depth of said counterbored portion, said head outer surface having a pair of depressions therein, one of said depressions extending below the plane of the outer surface of said one plate and the other of said depressions terminating above said plane when said counterbored portion has a predetermined depth and said rivet head has been properly seated within said counterbored portion.

5. A pair of plates having aligned rivet shank receiving openings and a recessed counterbored portion having vertical walls extending inwardly from the outer surface of one of said plates, and a rivet inserted within said openings and securing together said plates, said rivet comprising a shank and a head, said head having a greater thickness between its outer surface and its inner surface than the depth of said counterbored portion, said head outer surface having a pair of depressions therein, one of said depressions extending below the plane of the outer surface of said one plate and the other of said depressions terminating above said plane when said counterbored portions has a predetermined depth and said rivet head has been properly seated within said counterbored portion.

6. A method of fastening a pair of plates without leakage through the fastener opening and wherein the fastener fits flush with the outer surface of one of said plates, said method comprising the steps of fabricating a fastener with a uniform shank and a head with a flat undersurface and a cylindrical wall, making indentations in the top of the head to predetermined depths from the undersurface to indicate minimum and maximum acceptable thickness of the head and cooling the fastener to obtain material shrinkage, drilling aligned holes through said plates to receive the shank of said fastener, counterboring from the outer surface of said one of said plates at a diameter to provide for a snug fit with the fastener head when the head is in shrunk condition and to a predetermined depth to provide a seat for contact with the undersurface of the head of the fastener, inserting the fastener in its shrunk condition into the counterbored hole with enough force to drive the fastener head into contact with the counterbore seat, upsetting the shank of the fastener extending beyond the other of said plates to prevent withdrawal of the fastener, removal of the excess portion of the fastener head extending above the outer surface of said one of said plates, and measuring the thickness of the fastener head by determining the number of indentations remaining on the exposed head surface.

References Cited in the file of this patent

UNITED STATES PATENTS

| | | |
|---|---|---|
| 129,512 | Baker | July 16, 1872 |
| 1,545,943 | Crane | July 14, 1925 |
| 1,566,051 | Hill | Dec. 15, 1925 |
| 1,867,736 | Finkeldey | July 19, 1932 |
| 1,993,170 | Havener | Mar. 5, 1935 |
| 2,277,885 | Rodanet | Mar. 31, 1942 |
| 2,304,311 | Luce | Dec. 8, 1942 |
| 2,383,165 | Schuyler | Aug. 21, 1945 |
| 2,482,391 | Webster | Sept. 20, 1949 |
| 2,531,048 | Huck | Nov. 21, 1950 |
| 2,611,285 | Gross | Sept. 23, 1952 |

FOREIGN PATENTS

| | | |
|---|---|---|
| 133,093 | Great Britain | Oct. 9, 1919 |
| 808,306 | Germany | July 12, 1951 |